(12) United States Patent
Kraemer

(10) Patent No.: US 8,099,819 B2
(45) Date of Patent: Jan. 24, 2012

(54) TOOTHBRUSH

(75) Inventor: Hans Kraemer, Buehl (DE)

(73) Assignee: GlaxoSmithKline Consumer Healthcare GmbH & Co KG, Buehl (Baden) (DE)

( * ) Notice: Subject to any disclaimer, the term of this patent is extended or adjusted under 35 U.S.C. 154(b) by 1152 days.

(21) Appl. No.: 10/566,118

(22) PCT Filed: Jul. 22, 2004

(86) PCT No.: PCT/EP2004/008248
§ 371 (c)(1),
(2), (4) Date: Sep. 25, 2006

(87) PCT Pub. No.: WO2005/013762
PCT Pub. Date: Feb. 17, 2005

(65) Prior Publication Data
US 2007/0006410 A1    Jan. 11, 2007

(30) Foreign Application Priority Data

Jul. 25, 2003  (GB) .................................... 0317539.5

(51) Int. Cl.
*A46B 3/20*   (2006.01)
*A46B 9/04*   (2006.01)

(52) U.S. Cl. ........................................ 15/167.1; 15/201

(58) Field of Classification Search ................ 15/167.1, 15/201
See application file for complete search history.

(56) References Cited

U.S. PATENT DOCUMENTS

| | | | |
|---|---|---|---|
| 2,706,825 A * | 4/1955 | Blakeman | 15/176.4 |
| 4,633,542 A | 1/1987 | Taravel | |
| 5,355,546 A * | 10/1994 | Scheier et al. | 15/167.2 |
| 5,362,834 A | 11/1994 | Schaepel et al. | |
| 5,373,602 A | 12/1994 | Bang | |
| 5,454,133 A | 10/1995 | Garnet | |
| 5,456,642 A | 10/1995 | Frost | |
| 5,970,564 A * | 10/1999 | Inns et al. | 15/201 |
| 6,036,277 A | 3/2000 | Weihrauch | |
| 2002/0123562 A1 | 9/2002 | Stender et al. | |
| 2004/0025275 A1 * | 2/2004 | Moskovich et al. | 15/167.1 |
| 2005/0188487 A1 * | 9/2005 | Moskovich et al. | 15/167.1 |

FOREIGN PATENT DOCUMENTS

| | | |
|---|---|---|
| DE | A4122524 A | 2/1992 |
| DE | 20120773 | 4/2002 |
| EP | 0142885 A2 | 11/1984 |
| EP | 0336641 | 3/1989 |
| WO | WO A92/17092 | 10/1992 |
| WO | WO A92/17093 | 10/1992 |
| WO | WO A93/24034 | 12/1993 |
| WO | WOA96/02165 | 2/1996 |
| WO | WO A97/07707 | 3/1997 |
| WO | WO A97/24949 | 7/1997 |
| WO | WOA98/35584 | 8/1998 |
| WO | WO A98/37788 | 9/1998 |

(Continued)

*Primary Examiner* — Mark Spisich
(74) *Attorney, Agent, or Firm* — Joshua C. Sanders; Nora L. Stein; Theodore R. Furman

(57) ABSTRACT

A toothbrush head in which the fixed ends of the bristles are embedded in a mass of a polyurethane gel material incorporated in the head. Typical nylon materials as used for toothbrush bristles are found to bind with polyurethane gels so that advantageously holders for the bristles need not be used. A moulding process is also provided for making the toothbrush head.

6 Claims, 4 Drawing Sheets

FOREIGN PATENT DOCUMENTS

| | | |
|---|---|---|
| WO | WOA98/43514 | 10/1998 |
| WO | WO00/40115 | 7/2000 |
| WO | WOA00/60980 | 10/2000 |
| WO | WO03/001942 | 1/2003 |
| WO | WO03/001943 | 1/2003 |

* cited by examiner

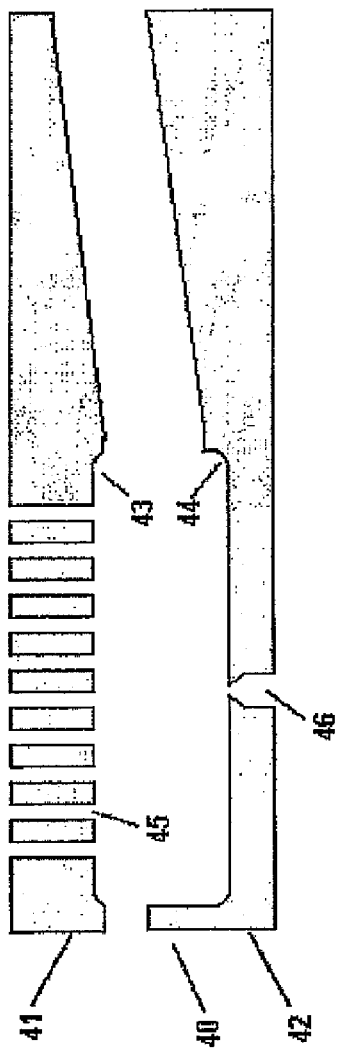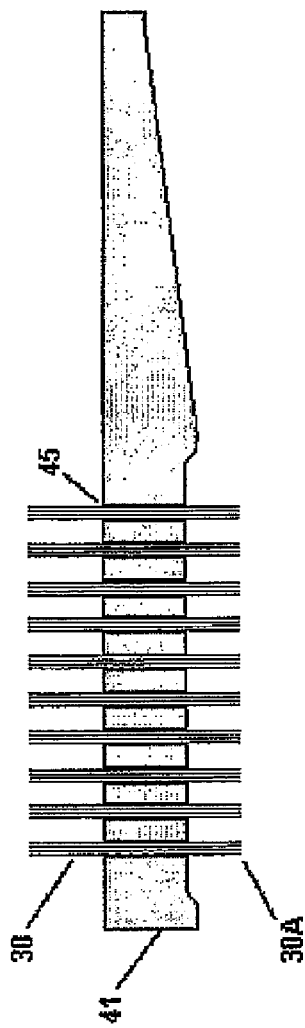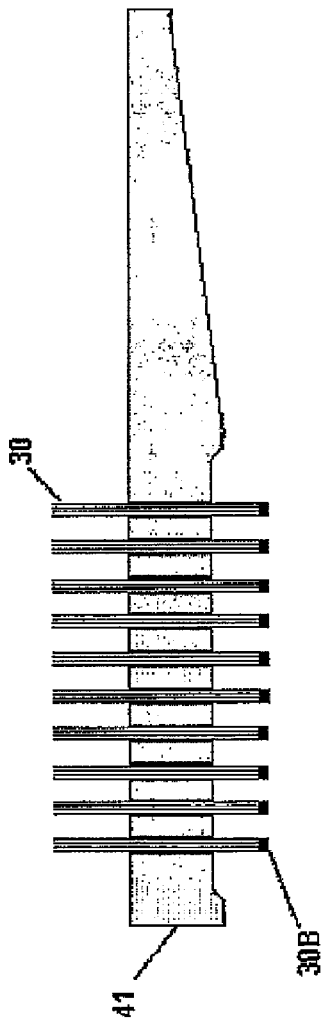

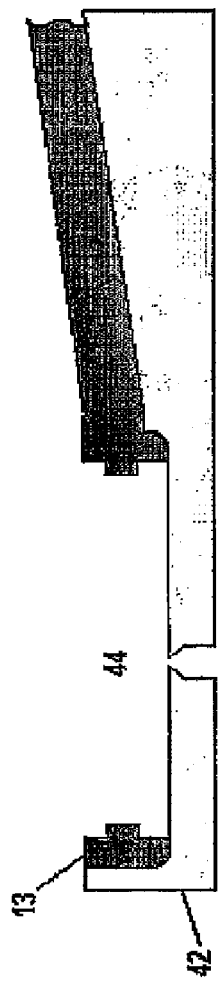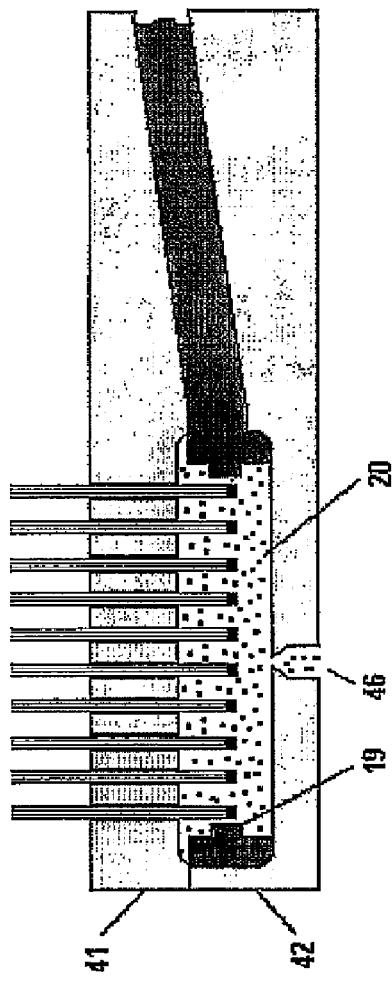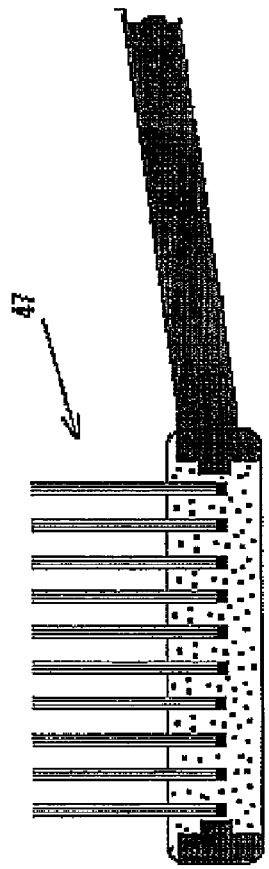

TOOTHBRUSH

This application is a 371 National Phase entry of international application number PCT/EP2004/008248, filed Jul. 22, 2004.

This invention relates to toothbrushes, in particular to toothbrushes having flexibly mounted bristles.

It is generally known to mount the bristles of a toothbrush in flexible mounts so that the mounting can respond to pressures applied to the bristles by resilient flexible deformation to cushion excess brushing pressures and to allow the bristles to accommodate themselves to the profiles of the teeth.

For example toothbrushes are known having the ends (the "proximate" end) of their bristles which are fixed into the head flexibly mounted in contact with a resilient elastomer material membrane. U.S. Pat. No. 4,633,542 discloses a toothbrush where the ends of individual tufts are moveably mounted with their proximate ends in contact with a flexible membrane. U.S. Pat. No. 5,373,602 discloses a toothbrush in which the ends of the bristles are set in a rubbery flexible tip extension to the head. WO-A-96/02165 discloses a toothbrush in which the tufts are set in a thermoplastic elastomer mount. U.S. Pat. No. 5,454,133 discloses a toothbrush in which the proximate ends of individual tufts are mounted in contact with a flexible pad or a capsule containing a very soft gel or liquid. DE-A-41 22 524 A discloses a toothbrush in which the proximate ends of bristles are mounted on a plate, the reverse side of which is in contact with an elastic pad. WO-A-98/43514 discloses a toothbrush head in which bristles in tufts are mounted in holders and are embedded in a soft elastic material. WO-A-00/60980 discloses a toothbrush head in which bristles in tufts have their ends linked by a web which is embedded in a soft elastic material. WO-A-98/35584 discloses a toothbrush head in which the bristle ends are mounted in rigid wells se in an elastomer material.

There is a problem with anchoring the bristles in such toothbrushes in that the polyamide materials e.g. nylons such as Tynex™, commonly used for bristles do not easily bond to common elastomer materials such as known SEBS thermoplastic elastomers. In U.S. Pat. No. 4,633,542 the bristle tufts have their ends proximate to the head fused into rounded masses which are simply in contact with the membrane. In WO-A-93/24034 the proximate ends of the bristles are again formed into rounded masses which are held in cavities in the membrane. In U.S. Pat. No. 5,454,133 the bristle tufts have their proximate ends fastened to a rubber base which is attached to the outer surface of the pad or capsule.

There is also an ever-present problem of improving and optimising the flexible mounting of toothbrush bristles in a toothbrush head, for example by the identification of improved materials and processes for toothbrush manufacture.

In recent years a class of polymer materials has been developed, primarily by Bayer AG, known as polyurethane gels. Such materials and methods of making them typically by reaction between an isocyanate component and a polyol component are for example disclosed in U.S. Pat. No. 4,456,642 (Bayer AG), U.S. Pat. No. 5,362,834 (Bayer AG), US-A-2002/0123562 (Bayer Corp.). Such gels often have a sticky surface and it is also known to provide such gels in a form enclosed with a flexible, normally elastic, film which may for example also comprise a polyurethane or other polymer. It is known e.g. from US-A-2002/0123562 (Bayer Corp.) to form such a coating in situ in the mould in which an article made from such a gel is made, i.e. the so-called in mould coating process ("IMC"). Although some polyurethane gels may be capable of injection moulding, it is also common to form the gel in situ in the mould by introduction of the isocyanate and polyol components into the mould an allowing them to react. Such polyurethane gels are for example sold under the trade name Technogel™ for example from the Technogel group of companies. To date such polyurethane gels have found use as inserts for shoes, cushions, soft car dashboard parts, bicycle saddles and other padded articles.

It is an object of this invention to provide a toothbrush in which the bristles are flexibly mounted onto the head which overcomes at least in part the problems encountered with the above-mentioned toothbrushes of the state of the art.

It is also an object of this invention to provide a novel use for the above-mentioned polyurethane gels.

It is also an object of this invention to provide a novel process for making a toothbrush head.

Other objects and advantages of the present invention will be apparent from the following description.

According to this invention a toothbrush head is provided having bristles projecting therefrom in a bristle direction, each bristle having an end proximate to the head and an end distanced from the head, characterised by the head incorporating a mass of a gel material, and at least a part of a bristle adjacent its end proximate to the head being embedded in the mass of gel material.

Gel materials may be distinguished from elastomers by the visco-elastic character of gels, i.e. though a gel deforms resiliently under pressure or tension, on release of the pressure or tension a gel does not immediately bounce back into its original shape like an elastomer does but returns to its original shape more slowly.

The gel material is preferably a polyurethane gel material. An example of a gel material is for example as disclosed in the above-mentioned U.S. Pat. Nos. 4,456,642, 5,362,834 and US-A-2002/0123562. For example such a polyurethane gel may comprise a high molecular weight polyurethane based on 15-62 wt % of a high molecular weight covalently crosslinked polyurethane matrix, and 38-85 wt % of a liquid dispersing agent firmly bound in the matrix, wherein the liquid dispersing agent contains one or more polyhydroxyl compounds having a number average molecular weight of ca. 1000 to 12000 and an OH number of between ca. 20 to 112 and where the dispersing agent is substantially free from hydroxyl compounds having a molecular weight below 800. Such gels form deformably elastic masses which retain their shape under the action of gravitational force on the toothbrush head, i.e. they are dimensionally stable, but deform under the action of applied pressure. The properties of the gel may be varied by variation of the starting components and ratios thereof but those gels which have a soft, somewhat tacky, gelatinous consistency are preferred. Gel materials as available at the date hereof under the name Technogel™ are preferred gel materials, for example as available from e.g. from Technogel Königsee, Gewerbegiet Alle Gärnerei, 37339 Berlingerode (DE), for example the gel material BTG 120. A suitable gel material of this type may have a hardness of less than 10 Shore A, preferably less than 2 Shore A. The hardness of the gel may also be expressed on the IRHD scale and a suitable hardness is IRHD L 0-100, for example L 25-65. Polyurethane gels of the above-mentioned type may be made with a wide range of hardness.

Suitably the mass of gel material is at least partly covered by, e.g. enclosed within, an elastic film coating, i.e. a coating which can deform elastically as the gel mass deforms under the influence of force and stretch or contract as the mass of gel expands or shrinks under tension or compressive pressure. In the case of the above-mentioned polyurethane gels suitable film coatings are known in the art, for example polyurethane films, thermoplastic polyester films, thermoplastic elastomers such as thermoplastic polyester elastomers or block co-polymers based on styrene and butadiene, films based on ethylene-vinylacetate polymers, natural or synthetic rubbers, or plasticised polyvinyl chloride. Various methods are known in the art to apply such a coating to such a mass of gel, a preferred process being the known IMC process. It is preferred that at least the part of the mass which has a surface exposed to the ambient environment is covered by such a coating. Such a coating can improve the surface feel, e.g. a smooth coating can cover a tacky gel. The thickness of such a film may be conventional in the art of polyurethane gel articles.

The gel material and/or the film may for example include a colourant material for aesthetic reasons or to draw the customers' attention to the presence of the gel mass.

The bristles may be made of a conventional bristle material e.g. a polyamide material e.g. nylons such as Tynex™ (DuPont) abovementioned, or polyester. For example nylon monofilaments of diameter ca. 0.10-0.75 mm, such as those commercially available from DuPont under the name DuPont Tynex, made from Nylon 612 may be used. Plural bristle filaments of such materials are normally bundled together into tufts, although such filaments may be set as a pattern of individual bristles in a toothbrush head.

A particular advantage of the abovementioned polyurethane gel material e.g. Technogel™ is that such bristle materials are found to readily bond with such a gel material without the use of the holder, web etc. used in the state of the art (although such holders or webs may be used in the present invention). For example a conventional tuft of plural Tynex™ bristles ca. 1 mm tuft diameter embedded into a pad of a Technogel™ polyurethane gel to a depth of ca. 2-3 mm can require up to 19N force to pull it out.

The adherence between polyamide bristles and the polyurethane gel material may be due to the presence of amide groups in both polyurethanes and nylon and may also apply to polyurethanes other than gels, e.g. elastomeric polyurethanes.

Therefore a further aspect of the invention provides a toothbrush head having bristles projecting therefrom in a bristle direction, each bristles having an end proximate to the head and an end distanced from the head, characterised by the head incorporating a mass of a polyurethane material, and at least a part of a bristle adjacent its end proximate to the head being embedded in the mass of polyurethane material.

The mass of polyurethane material may be a polyurethane gel material, e.g. as disclosed herein, or a polyurethane elastomer material.

Therefore in the toothbrush of this invention over the entire part of the bristle(s) or tufts thereof which is embedded in the mass of gel material or polyurethane material, the bristle(s) or tuft may be directly in contact with the gel or polyurethane material. That is, there need be no web or holder means as hitherto used in the state of the art to retain the bristles.

The proximate end of the bristle(s) or tuft(s) and a length of the bristle(s) adjacent thereto toward the end distanced from the head may be embedded in the mass.

The mass of gel or polyurethane material may have a thickness, i.e. its dimension in the bristle direction, up to the conventional thickness of toothbrush heads, for example 3-5 mm. The toothbrush head will normally be connected to, or connectable to in the case of a replaceable head toothbrush, a toothbrush handle to define a head-handle longitudinal direction. In directions perpendicular to the bristle direction, for example in the longitudinal direction and in the width direction perpendicular to the longitudinal direction the mass may have a dimension up to the entire length or width of a conventional toothbrush head, typically up to 3 cm long or up to 1.5 cm wide. In practice the dimensions of the mass may be selected in combination with the mass to provide a desired degree of flexible mounting of the toothbrush bristles.

The toothbrush head of this invention may comprise a single mass of the gel or polyurethane material, or may comprise plural e.g. two or more masses of the gel or polyurethane material. When there are two or more such masses they may be the same gel or polyurethane material or different materials, e.g. having different compositions, coatings, hardness, colour etc. When there are plural such masses they may have the same dimensions or different dimensions, e.g. differing in thickness etc. Two or more such masses may be disposed in various ways about the toothbrush head, e.g. they may be disposed sequentially longitudinally, sequentially widthways, or one mass may surround another.

As viewed looking down the bristle direction a mass of gel or polyurethane material may in plan be polygonal, circular, oval, strip form, or correspond generally to the shape of the toothbrush head or a part thereof. For example the material may occupy substantially the entire area of the head from which bristles project. A mass of material may be located adjacent the end of the head closest to or furthest from the handle or at an intermediate longitudinal position. Typically the mass is in the form of a pad with greater longitudinal and width dimensions than thickness. The bristles project from a surface of the mass, and this surface (the "bristle surface") may be flat, convex, concave or undulating e.g. having a surface comprising plural rounded domes or cones, or of a vave-form.

Typically the toothbrush head of this invention comprises a frame of a hard plastics material, as commonly used in toothbrush manufacture, e.g. polypropylene ("PP"), polyamide ("PA"), acrylonitril butadiene styrene ("ABS") etc., by which the mass is supported. Such a frame may for example comprise a ring shape of the plastics material defining the perimeter of the head supporting the mass at the perimeter of the mass. Alternatively the frame may comprise a back surface against which the mass is in contact. Alternatively the frame may comprise one or more cavity each respectively supporting one or more mass of the material. Alternatively the frame may comprise a longitudinally extending skeleton. The frame and mass may be provided with respective engagement features to retain the mass and frame in secure physical engagement, and/or the frame and mass may be bonded e.g. by a weld, adhesive or adherence between the frame and the mass. It is found that the gel and polyurethane materials mentioned above, particularly polyurethane gels such as the Technogel™ polyurethane gel materials bind well to the plastics materials commonly used for toothbrush manufacture, in particular PA and ABS.

Typically bristle filaments may be disposed in tufts containing conventional numbers of bristles and of generally conventional shapes and dimensions. For example tufts may contain 5-100, preferably 10-75, e.g. 30-60 bristles per tuft. Such tufts may for example be of circular or non-circular e.g. longitudinally or widthways elongated cross section, and may have a typical dimension across their length of 0.75-5 mm. Circular sectioned tufts typically have a diameter ca. 0.9-1.5 mm, and may have their ends proximate to the head embedded in the mass of gel material to a depth of 0.5-5 mm, typically 1-3 mm, for example so that the proximate ends are disposed part way through the thickness of the mass from the bristle surface. In such tufts the proximate ends of the individual bristles may be melted by heat so that they fuse together to form a blob, and then allowed to cool and solidify, prior to being embedded in the mass. Techniques to fuse the ends of toothbrush bristle tufts are known in the art. Alternatively bristles may be embedded individually rather than plurally in tufts.

The depth at which the proximate end of a bristles is disposed in the mass of gel or polyurethane material will be among the factors determining the flexibility with which the bristle is mounted (other factors e.g. include bristle material, dimensions etc.), and different tufts or individual bristles may have their proximate ends disposed at different depths within the mass to provide bristles or tufts of different flexibility of mounting. The bristles may project in a bristle direction substantially perpendicular to the longitudinal axis of the toothbrush, but may alternatively be angled to the vertical.

Another particular advantage of the abovementioned polyurethane gel material e.g. Technogel™ is that such gels are available having softness which provides greatly improved flexible mounting of bristles therein. For example under the influence of pressure on the bristles during toothbrushing the gel material can easily deform e.g. to absorb excessive brushing pressures and/or to allow the surface of the ends of the bristles to adapt to the contours of the teeth and/or gums.

Other parts of the toothbrush for example the toothbrush handle may be of generally conventional construction. For example the handle may incorporate one or more "S" bends as disclosed in EP-A-0 336 641. Additionally or alternatively the toothbrush may incorporate flexible links at other places in its structure, for example between its head and the immediately adjacent part of its handle, i.e. its neck, e.g. as disclosed in WO-A-92/17092 or WO-A-97/24949, or the head may comprise two or more flexibly linked segments for example as disclosed in WO-A-92/17093 or WO-A-97/07707, or there may be a flexible link both between the head and neck, and dividing the head into flexibly linked segments, e.g. as disclosed in WO-A-98/37788.

A further aspect of this invention provides a process for making a toothbrush head having bristles projecting therefrom in a bristle direction, each bristle having an end proximate to the head and an end distanced from the head, the head incorporating a mass of a gel or polyurethane material, and at least a part of a bristle adjacent its end proximate to the head being embedded in the mass of gel material or polyurethane material.

Preferred features of the head, gel or polyurethane mass, bristles etc. are as discussed above.

In the case of polyurethane elastomer materials processes are known from the state of the art referred to above for forming a mass of polyurethane material with bristles embedded therein.

A preferred form of this process comprises:

(1) providing a mould having a mould cavity suitable for forming the mass of a gel material in, and having at least one aperture leading from said cavity toward the exterior of the mould and being suitable for the insertion therethrough of at least one toothbrush bristle such that an end of the bristle projects into the cavity, (2) depositing a coating-forming material on the inner surface of the cavity, (3) inserting at least one bristle through said aperture so that an end of the bristle extends into the cavity, (4) introducing a gel material into the cavity such that at least part of the bristle extending into the cavity becomes embedded in the gel material and the coating-forming forms a coating around at least part of the mass of gel material.

The mould may be generally conventional, e.g. being made of conventional metals such as steel, split along a parting line into two or more parts each part comprising a part-cavity which may be brought together to form the mould cavity, having at least one port for the introduction of the gel material, having generally conventional ejector means for ejecting the so-formed mass from the mould etc. Many of such features of the mould are generally conventional in the art of toothbrush manufacture.

The coating-forming material may be a conventional coating-forming material as used in the art of polyurethane gel technology to for example form an elastic polyurethane coating around the gel mass, see for example the IMC process disclosed in US-A-2002/0123562. The coating-forming material may for example be provided in liquid form and may be sprayed or otherwise deposited on the inner surface of the cavity, preferably before part moulds are closed, but a mould may be constructed in which the material is sprayed onto the inner surface of the mould cavity after closure of part moulds. After depositing the coating-forming material onto the inner surface of the cavity the material may be allowed or caused to form the coating e.g. by gentle heating, or the material may be caused to form the coating subsequent to introducing the gel material, e.g. by causing the coating forming material to cure and harden.

At least one tuft of bristles may now be inserted through the aperture so that an end of the bristle extends into the cavity. This insertion operation is conventional in the art of so called "anchorless" bristled toothbrush heads in which the ends of the bristles or tufts are embedded in the hard plastic material of the head as this is injected into the mould to form the head, rather than being retained by the previously used small metal "anchors", and conventional insertion machinery e.g. as supplied by Zahoransky Formgebau GmbH (DE) may be used. It is preferred to perform the deposition of the coating-forming material before the insertion of the one or more bristle otherwise the coating-forming material may become deposited on the bristle(s) and interfere with the bonding or otherwise adherence of the gel material to the bristle(s). Plural bristles may be bundled together in a conventional manner to form a tuft, and prior to but preferably after inserting a tuft into the mould through the aperture the proximate end of the tuft may be melted by heat in a conventional manner e.g. as disclosed in EP-A-0 142 885 so that the ends fuse into a blob and are then allowed to cool and solidify. Conventional insertion machinery and suitable selection of relative dimensions for the tuft and aperture may also provide a fluid-tight seal between the tuft and aperture. For example the bristles may be bundled to form a tuft, an end of the tuft inserted through the aperture in a part of a multi part mould whilst the mould is open, so that the end projects from the inner surface of the mould, the end may be fused and allowed to cool as described above, then the mould may be closed. Preferably the proximate end of the tuft is inserted through the aperture to a distance such that some un-fused bristles are present within the mould cavity, i.e. only a short part of the proximate end is fused, so that when the gel is introduced into the cavity the gel can infiltrate between the un-fused bristles to facilitate anchoring of the tuft into the gel mass.

When the mould is closed the gel material may be introduced into the mould cavity. Conventional methods may be used to introduce the gel material. Some gel materials e.g. thermoplastic polyurethane ("TPU") may be injected under pressure into the mould in a conventional injection moulding process, i.e. in a hot fluid state and allowed to cool to achieve their final gel state.

Alternatively the gel material may be introduced into the mould as a fluid precursor which needs to undergo a chemical reaction to cause it to set into its final gel state. For example such a precursor may comprise a mixture of reagents which react in the cavity to form the gel material, e.g. comprising an isocyanate component and a polyol component (e.g. as disclosed in U.S. Pat. No. 5,362,834) which react to form a polyurethane gel. Such reagents may be introduced into the mould cavity in a pre-mixed state or may be introduced separately into the cavity to mix in situ therein. Using conventional reagents of this type mould cycle times of ca. 10-20 seconds may be achieved, although subsequent gradual hardening of the gel material may occur during subsequent storage. Polyurethane gels may be formed in this way at ambient temperatures and pressures in the mould, although elevated temperatures generally accelerate the reaction process. The precursor material introduced into the mould cavity may include a catalyst to induce reaction to form the gel, and the catalyst in the precursor may also serve to convert the coating forming material into the elastic film. Otherwise known curing processes may be used to convert the coating forming material into an elastic coating. By covering the sticky surface of the gel, the coating material can help to prevent the mass of gel from sticking to the inner surface of the mould cavity, i.e. to some extent additionally functioning as a mould release agent.

The gel or its precursor should be introduced into the mould cavity at such a pressure and in such a fluid state that it infiltrates between the individual bristles in a tuft. In this way the tuft can become firmly anchored into the mass of gel.

Thereafter the mould may be opened, e.g. the part moulds separated at their part line, and conventional ejection apparatus may be used to eject the mass of gel with the tufts embedded therein, from the mould.

The above described process may be performed in a variety of modes. In one mode the mass of gel with the tufts embedded therein may be made as a separate part from the hard plastic part(s) of the toothbrush head, e.g. the above-mentioned frame, and this formed mass of gel with the tufts embedded therein may then be fixed into the head, e.g. by means of mechanical fixing such as by means of interlocking parts of the mass and the frame, or by means of the head having suitable retention means to securely hold the mass in place. For example the head may comprise connecting parts which connect to at least partly enclose and/or grip the mass. For example the gel mass, particularly the coating, may be adhered to the head by e.g. an adhesive or weld.

In another mode at least part of the head of the toothbrush may itself be enclosed within the mould cavity, which may be done simultaneously or before or after insertion of the bristle(s) through the aperture, so that a surface of the head, e.g. of the frame, is exposed to the interior of the cavity, and so that when in the ir inserted position with the mould closed the end of the bristle(s) is in close proximity to the head, and the gel or its precursor may then be introduced into the mould to form the gel mass in situ in position on the head and fixed thereto. It is preferable to deposit the coating-forming material on the interior surface of the mould cavity before enclosing the at least part of the head within the cavity so that the coating-forming material is not deposited on the head where it might interfere with adherence of the gel material to the hard plastic of the head. It is found that the above mentioned polyurethane gel materials adhere well to the kinds of hard plastic materials commonly used for toothbrush manufacture such as PA, ABS and PP both when they are injected into the mould cavity in fluid form as a TPU, or formed in situ in contact with the hard plastic material from a precursor as described above. Alternatively or additionally the head may have one or more engagement means so that when the gel is introduced into the mould in a fluid form, e.g. by TPU injection or as a precursor and then sets into its final state the head and mass are securely mechanically connected, for example by the fluid flowing around the engagement means.

Alternative processes will be apparent to those skilled in the art, for example the mass of gel material with bristles embedded therein may be formed first, then the coating may be formed using known processes for example applying a solution or precursor of a coating material in a fluid state and allowing this to form the coating.

Suitable plastics materials from which the head and handle of the toothbrush of the invention may be made includes plastics material such as known plastics materials which are used in the manufacture of toothbrushes. For example known PP, PA and ABS materials may be used, optionally in combination with elastomer materials commonly used as components of so called two-component toothbrushes. Known injection moulding processes may be used to make the toothbrush of the invention from such plastics materials and elastomer materials.

The invention will now be described by way of example only with reference to the accompanying drawings in which.

FIG. 4a schematically shows a step in a process for making the toothbrush head of FIG. 1 and FIGS. 2a to 2d.

FIG. 4b schematically shows a step in a process for making the toothbrush head of FIG. 1 and FIGS. 2a to 2d.

FIG. 4c schematically shows a step in a process for making the toothbrush head of FIG. 1 and FIGS. 2a to 2d.

FIG. 4d schematically shows a step in a process for making the toothbrush head of FIG. 1 and FIGS. 2a to 2d.

FIG. 4e schematically shows a step in a process for making the toothbrush head of FIG. 1 and FIGS. 2a to 2d.

FIG. 4f schematically shows a step in a process for making the toothbrush head of FIG. 1 and FIGS. 2a to 2d.

Figure 1:
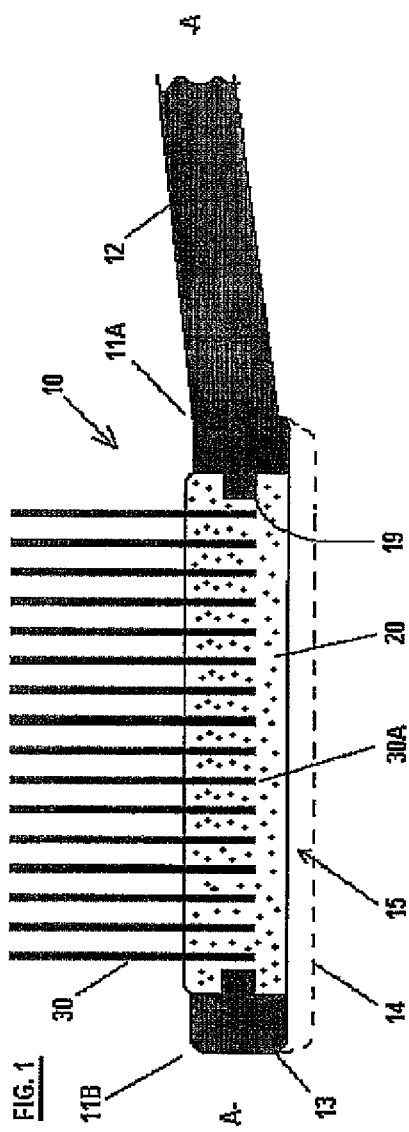
FIG. 1 shows a longitudinal section through a toothbrush head of this invention.

Parts referred to in FIGS. 1-4:
10 head of a toothbrush
11A handle end
11B tip end
12 grip handle
13 ring-shaped frame
14 closed back surface (optional)
15 central cavity
16 partition
17,18 cavities
19 engagement flange
20 mass of gel material
21,22 two masses of gel material
23,24,25 three masses of gel material
26,27 two masses of gel material
28 thin elastic coating of a polyurethane
30 embedded bristles
30A proximate ends of bristles
30B fused bristles
30C unfused bristles infiltrated with gel
40 mould generally
41,42 two part moulds 43,44 two part cavities
45 plural apertures for insertion of tufts
46 port
47 formed toothbrush head Referring to FIGS. 1 and 2 the head 10 of a toothbrush of the invention is shown, being of elongate shape and integrally joined at one longitudinal end 11A to a grip handle 12 of which only the part proximate to the head 10 is shown, and having an opposite tip end 11B. The head 10 and handle 12 are arranged along a longitudinal direction A-A. The head 10 and handle 12 are integrally made of plastic material, typically a PA, ABS or PP.

As seen more clearly in the plan views of FIG. 2 the head 10 is in the shape of a ring-shaped frame 13 of an overall shape conventional in the art of toothbrush heads. As seen in FIG. 1 this frame 13 has an open upper and lower face, but as shown with dashed lines in FIG. 1 may have a closed back surface 14. The interior of the ring shaped frame defines a central cavity 15. As shown in FIG. 1 there is a single cavity within the frame 13. The frame may for example be bridged by e.g. an integral plastics material partition 16 to form two separate cavities 17,18 (see FIG. 2B). The frame 13 is formed with an engagement flange 19 around its inner perimeter.

Within frame 13 is fixed a mass of a gel material 20, in which are embedded bristles 30. The bristles 30 project from the mass 20 in a bristle direction shown by the arrow. The bristles 30 have ends 30A proximate to the head which are embedded in the mass of gel material and ends 30B distanced from the head. The mass 20 is generally in the shape of a flattened pad corresponding to the internal shape of the frame 13 and occupying the cavity 15. Although as shown in FIG. 1 the mass has a flat upper (i.e. facing in the bristle direction) surface, this upper surface may be convex, concave, rippled in an undulating manner or any other surface profile. The opposite lower surface may be in contact with the back face 14 if this is present or there may be a gap between the lower surface and the back wall. The gel mass 20 is retained in place by its engagement with the engagement flange 19, but as made by the process described below is also securely bonded to the material of the frame 13.

Alternatively the mass can be secured in place by other means, e.g. by making the frame in an upper frame part and a lower frame part and fixing these together to clamp the mass between them.

Figure 2A:
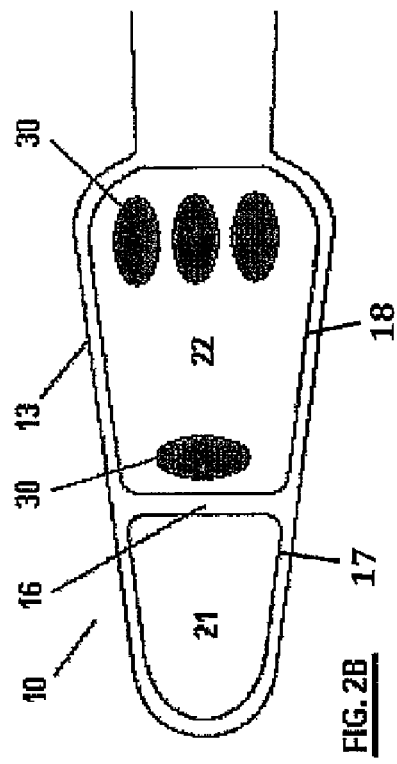
FIG. 2a shows a plan view of a toothbrush head based on that of FIG. 1.
Figure 2B:
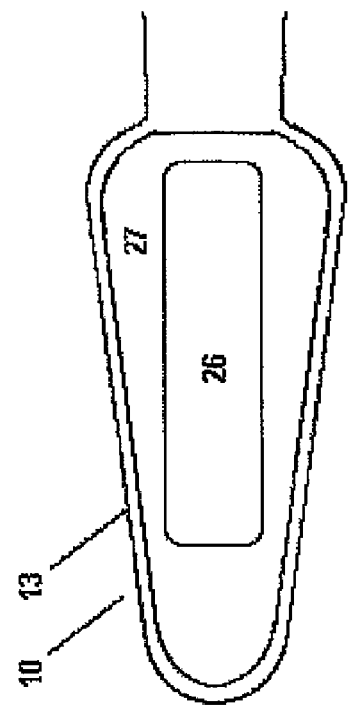
FIG. 2b shows a plan view of a toothbrush head based on that of FIG. 1.
Figure 2C:
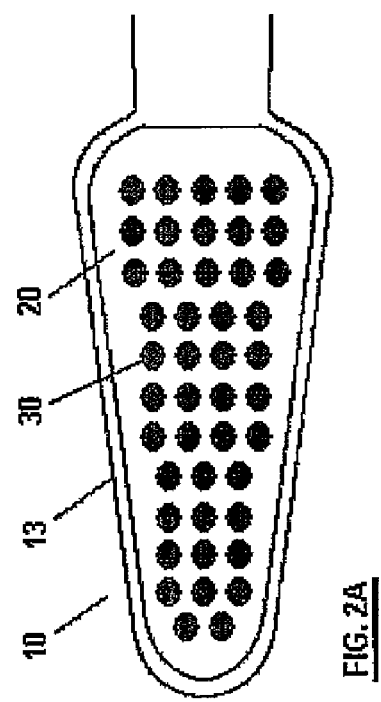
FIG. 2c shows a plan view of a toothbrush head based on that of FIG. 1.
Figure 2D:
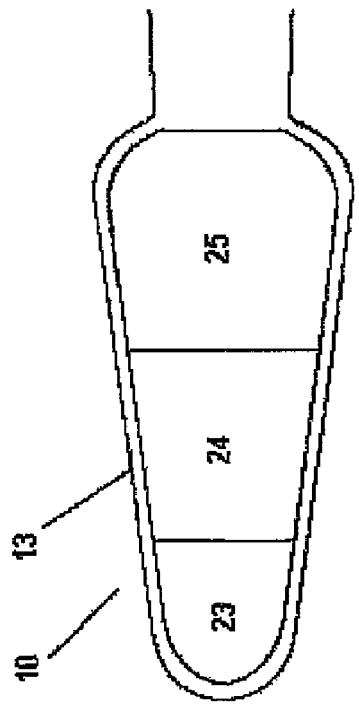
FIG. 2d shows a plan view of a toothbrush head based on that of FIG. 1.

FIG. 2A shows the plan view of the head of FIG. 1. As seen in FIGS. 1 and 2 there is a single mass 20, but as seen in FIG. 2 there may be two or more masses. FIG. 2B shows two masses 21,22 separated by the integral partition 16. FIG. 2C shows three masses 23,24,25 in contact with each other and sequentially longitudinally disposed. FIG. 2D shows two masses 26,27 in which one mass 26 is surrounded by the other mass 27. The various masses 21-27 may each be the same, or may differ in relative softness or in other characteristics e.g. colour. For example masses 23 and 25 may be relatively softer than mass 24, or vice versa. For example the masses 23, 24, 26 may progressively be softer, or mass 26 may be softer than mass 27 or vice versa. Masses 26,27, and 23,24,25 in contact with each other may be bonded together. The pattern of bristle tufts 30 shown is purely representative, bristles are omitted for clarity from FIGS. 2C and 2D. In FIG. 2B bristle tufts 30 are shown which are of longitudinal or widthways elongated sections.

Numerous other constructions of a suitable head comprising a hard plastics material frame or skeleton with bristles embedded in a polyurethane gel mass will be apparent to those skilled in the art. For example the frame may comprise a plate forming the back face of the toothbrush head, with the gel mass attached to the opposite face of the plate.

Figure 3:
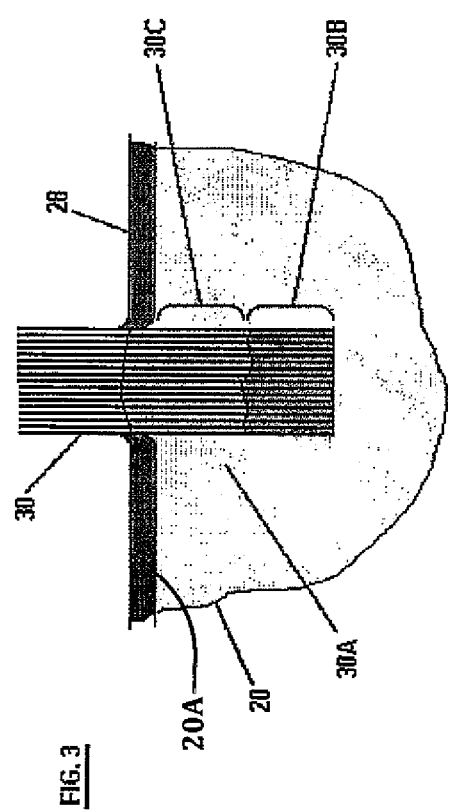
FIG. 3 shows an enlarged section through the gel mass of FIG. 1.

Referring to FIG. 3 the proximate end 30A of a tuft of plural bristles 30 and the immediately adjacent part of the gel mass 20 are shown. At the proximate end 30A the individual bristles in the tuft 30 have been fused together over length 30B by the application of heat in a conventional manner, e.g. radiant heat, hot gas or contact with a hot surface, and allowed to cool and solidify into a solid blob. This proximate end 30A is embedded in the mass 20 of gel material. At the proximate end 30A the entire part of the bristles which is embedded in the gel material is directly in contact with the gel material. Only a short length 30B of the tuft adjacent to the proximate end of the tuft 30 toward the distanced end has been fused, so that the gel material 20 has infiltrated between individual bristles of tuft 30, i.e. a length of unfused individual bristles 30C remains above part 30B, between part 30B and the upper surface 20A of the gel mass 20. The mass 20 is a gel of the type sold under the trade name Technogel™, i.e. a soft polyurethane gel and is covered by a thin elastic coating 28 of a polyurethane, the thickness of which is greatly exaggerated in FIG. 3. Such material may be a Technogel™ as available from Technogel Königsee GmbH for example the material BTG 120.

Bristle tufts 30 mounted in the mass 20 as shown have the advantages that they can both swivel elastically about their mountings about any axis in a cone with its apex at the mounting point, and also move elastically up and down under pressure experienced during tooth cleaning. These movements can help the bristles to accommodate to the surfaces of the teeth and gums, e.g. the interdental spaces, and to relieve excessive brushing pressures. In the mass 20 all of the tufts 30 may be mounted with their proximate ends 30A at the same depth in the mass 20, or alternatively bristles, tufts or groups of tufts may be mounted at different depths to give them different elastic swiveling and up and down flexibility. Generally the shallower the mounting the less force is needed to swivel the bristle or tuft. For example in a head provided with more than one mass 20, e.g. as shown in FIG. 2A-2D the respective tufts 30 embedded therein may be mounted with their proximate ends 30A at different depths in the gel mass 20.

Referring to FIG. 4 a process for manufacturing a toothbrush head of this invention is shown schematically.

In FIG. 4A a mould 40 (generally) is shown in section. Mould 40 comprises two part moulds 41, 42 which are conventionally split and between them define two part cavities 43,44 which when the mould is closed form the mould cavity 43,44. In part mould 41 are plural apertures 45 leading from the part cavity 43 toward the exterior of the mould and are suitable for the insertion therethrough of respective plural tufts of toothbrush bristles (30 in FIGS. 1-3) such that an end of each tuft may project into the cavity. Moulds of this type with apertures, and machinery for inserting tufts of bristles through them are known in the field of toothbrush manufacture. The part cavity 44 of part mould 42 is shaped to receive the frame 13 of a toothbrush head 10 as shown in FIGS. 1 and 2. Part mould 42 has a port 46 through which fluid material may be introduced into the cavity 43,44.

A coating-forming material (not shown) is deposited on the inner surfaces of the cavities 43,44 by for example spraying or brush coating of a liquid coating forming material, such as an elastic polyurethane film forming material, which may be a material of a type known for a IMC process. This coating forming material is then allowed to form the coating, typically by gentle heating in a known manner.

As shown in FIG. 4B plural tufts of bristles 30 are inserted through apertures 45 so that a proximate end 30A of the tuft 30 extends through from the inner surface of the cavity 43. The proximate ends 30A extend to such a distance from the inner surface of part cavity 43 that when the mould is subsequently closed (as seen in FIG. 4E) the end 30A is distanced from the opposite inner surface of part cavity 44.

As shown in FIG. 4C the ends 30A of the tufts 30 are now fused by the application of heat and then allowed to cool to form a blob 30B of hardened material at the end 30A.

As shown in FIG. 4D, in parallel with the above-described operations a frame 13 is enclosed in cavity 44.

As shown in FIG. 4E The mould 40 is now closed and a polyurethane gel material is now introduced into the cavity 43, 44 by introducing a fluid mixture of a polyol component and an isocyanate component into the cavity via port 46 under conditions such that the mixture infiltrates between the individual bristles of the tuft 30 and then sets to form the polyurethane gel. Alternatively a thermoplastic polyurethane gel material may be injected under pressure into the mould in a hot fluid state in a conventional injection moulding process under conditions such that the hot fluid material infiltrates between the individual bristles of the tuft 30, and then sets to form the polyurethane gel. In this way the end 30A extending into the cavity becomes embedded in the gel material. Under the conditions of either formation of the polyurethane gel in situ from the polyol and isocyanate components, or injection as a fluid which sets, the gel mass 20 becomes firmly adhered to the frame 13, interlocking with the engagement flange 19, and the bristles 30 of the tuft become firmly fixed into the gel material 20.

Thereafter the mould 40 may be opened, i.e. the part moulds 41,42 are separated at their part line, and conventional ejection apparatus (not shown) may be used to eject the formed toothbrush head 47 with the mass of gel 20 with the tufts 30 embedded therein, from the part mould 42.

An analogous process may be used to make a toothbrush head of the type shown in FIG. 1 having the closed back surface 14. However in this case if the polyurethane gel is to be introduced via port 46 it may be necessary to provide an orifice (not shown) through the closed back surface 14 so that the gel material may pass from port 46 into the mould cavity 43,44. Alternatively the port 46 may be located in another position in the part mould 41 or 42. Various other locations for the port 46 will be apparent to those skilled in the art.

It will be understood by those skilled in the art that by an analogous process a pad 20 of a gel mass may be made per se separately from frame 13 and then introduced into the frame 13 and fixed therein.

EXPERIMENTAL EXAMPLE

The material Technogel™ is a polyurethane gel covered with a polyurethane coating and is available from the company Technogel Königsee, Gewerbegiet Alle Gärnerei, 37339 Berlingerode (DE), for example as the gel material BTG 120, in the form of polyurethane film coated sheets ca. 5 mm thick. These sheets are made using an IMC process by introducing the polyurethane gel precursor reagents into a mould and allowing them to react to form the gel. Conventional Tynex™ toothbrush bristle filaments were bundled into circular sectioned tufts ca 1.0-1.2 mm diameter with a conventional bristle density, both white and blue colour filaments being used. Such filaments were also bundled into oval sectioned tufts of major:minor axis dimensions 6 mm:4 mm. An end of each of such tufts was melted by touching against a hot surface and allowed to cool and re-solidify so that a blob of fused bristle material ca. 0.5 mm long was formed. The fused ends were held in the mould and the gel formed under standard conditions as described above so that ca. 4.5 mm of the tuft adjacent the fused end was embedded in the gel mass. These tufts were found to be firmly fixed into the gel mass and required at least 19N force to pull them out.

The invention claimed is:

1. A toothbrush head having nylon bristles projecting therefrom in a bristle direction, each bristle having an end proximate to the head and an end distanced from the head, wherein the head incorporates a mass of a visco-elastic polyurethane gel material which has a hardness of less than 10 Shore A in the form of a pad having a thickness, and at least a part of a bristle adjacent its end proximate to the head being embedded in the mass of polyurethane gel material, and wherein the polyurethane gel material bonds to the nylon bristles, and the ends of the bristles are mounted with their ends proximate to the head disposed part way through the thickness of the mass of polyurethane gel to thereby provide a flexible mounting for the bristles.

2. A toothbrush head according to claim 1 wherein the polyurethane gel material has a hardness of less than 2 Shore A.

3. A toothbrush head according to claim 1 wherein the mass of polyurethane gel material is at least partly covered by an elastic film coating which can deform elastically as the polyurethane gel mass deforms under the influence of force.

4. A toothbrush head according to claim 3 wherein the film coating is a polyurethane film.

5. A toothbrush head according to claim 1 further comprising a frame of a hard plastics material by which the mass of polyurethane gel material is supported.

6. A toothbrush head according to claim 5 wherein the hard plastics material is a polypropylene, polyamide or acrylonitrile butadiene styrene.

* * * * *